United States Patent [19]

Gorlov

[11] Patent Number: 4,464,080

[45] Date of Patent: Aug. 7, 1984

[54] HIGH VOLUME TIDAL OR CURRENT FLOW HARNESSING SYSTEM

[76] Inventor: Alexander M. Gorlov, 234 Main St., Medford, Mass. 02155

[21] Appl. No.: 338,482

[22] Filed: Jan. 11, 1982

Related U.S. Application Data

[63] Continuation of Ser. No. 65,114, Aug. 9, 1979, abandoned.

[51] Int. Cl.$^3$ .......................... E02B 9/08; F03B 13/12
[52] U.S. Cl. ........................................ 405/76; 60/398;
60/407; 405/78; 417/100
[58] Field of Search ................. 60/407, 409, 410, 398;
290/42, 43, 53, 54; 405/76, 78, 75; 417/100,
150, 226, 330

[56] References Cited

U.S. PATENT DOCUMENTS

| | | | |
|---|---|---|---|
| 398,779 | 2/1889 | Hagerty | 405/78 |
| 968,016 | 8/1910 | Willvome | 91/341 R |
| 1,342,682 | 6/1920 | Knowlton | 60/398 |
| 2,457,594 | 12/1948 | Nettel et al. | 60/682 |
| 2,484,183 | 10/1949 | Paulson | 417/100 |
| 4,095,423 | 6/1978 | Gorlov | 60/398 |
| 4,098,081 | 7/1978 | Woodman | 60/398 |
| 4,103,490 | 8/1978 | Gorlov | 60/398 |

FOREIGN PATENT DOCUMENTS

| | | | |
|---|---|---|---|
| 154188 | 8/1921 | United Kingdom | 405/76 |
| 2006879 | 5/1979 | United Kingdom | 60/398 |

*Primary Examiner*—Irwin C. Cohen
*Attorney, Agent, or Firm*—Weingarten, Schurgin, Gagnebin & Hayes

[57] ABSTRACT

Apparatus permitting the utilization of large volumes of water in the harnessing and extracting of a portion of the power generated by the rise and fall of ocean tides, ocean currents, or flowing rivers includes the provision of a dam, and a specialized single cavity chamber of limited size as compared wth the water head enclosed by the dam, and an extremely high volume gating system in which all or nearly all of the water between the high and low levels on either side of the dam is cyclically gated through the single chamber from one side of the dam to the other so as to alternately provide positive air pressure and a partial vacuum within the single chamber. In one embodiment, the specialized chamber has a barrier at the bottom which divides the bottom of the chamber in half, large ports at the bottom of the chamber to permit inflow and outflow of high volumes of water, and ganged structures having a higher total area than that of corresponding ports, in which the structures form sluice gates to selectively seal off and open different sets of ports. In another embodiment, a single chamber is used without a barrier. In this embodiment, vertical sluice gates are used which may be activated automatically by pressures acting on the sluice gates as a result of ingested and expelled water.

10 Claims, 13 Drawing Figures

HIGH VOLUME TIDAL OR CURRENT FLOW HARNESSING SYSTEM

This is a continuation of application Ser. No. 065,114, filed Aug. 9, 1979, and now abandoned.

FIELD OF THE INVENTION

This invention relates in general to devices for deriving useful power from tidal motion of the oceans, ocean currents, or river flow and, in particular, to a method and apparatus for extracting power in readily usable form through the processing of extremely large volumes of water.

BACKGROUND OF THE INVENTION

As explained in U.S. Pat. No. 4,103,490, issued to Alexander M. Gorlov on Aug. 1, 1978, the patent and its references being incorporated herein by reference, there have been many systems utilized for the harnessing of tidal power. In that patent, a single tidal chamber is utilized in which a housing is mounted on the ocean bed with ports of ingress and egress near the bottom or lower part of the housing, through which tidal waters may flow. Positive air pressure is built up in the housing by rising tides, and partial vacuums are built up in the housing by falling tides. In the abovementioned patent, the positive air pressure or partial vacuum at the top of the housing is connected through auxiliary high pressure and low pressure chambers to a two-state revolving valve having two input ports and two output ports. The output ports may be connected to a reciprocating air motor so that low level energy in the last one foot or so of the tide may be made to do useful work.

As will be seen, while this system works well for small scale operations, its capacity is limited by the physical size of the housing. Only such potential energy as can be stored in the height of water within the housing can be used during any one tidal cycle.

In a second U.S. Pat. No. 4,095,423, issued to Alexander M. Gorlov on June 20, 1978 and incorporated herein by reference, a similar system is described in which a dam structure is used which does not require of roof over four walls. Here, rather than using an air valve, a water valve is employed.

It is a feature of the second patent, as well the first patent, that relatively low amounts of tidal fluctuation can be made to do useful work. Thus even the last foot of tide can power a reciprocating air engine, even if the water head is too low to run a conventional turbine.

While this second system works well for small scale plants, the size and flow capacity of the valve limits the amount of water than can do useful work during a tidal cycle.

In general, if one wishes to harness the tides at the Bay of Fundy, a system must be devised to handle many millions of cubic feet of water per hour. By so doing, thousands of megawatts of power can be produced. To accomplish this the housing of the first patent would have to be as large as the Bay of Fundy if all available energy were to be extracted. As will be appreciated, the cost of construction of extremely large housings is prohibitively high if one were to attempt to harness all of the water head available in a tidal creek, bay or reservoir.

SUMMARY OF THE INVENTION

Accordingly, the present invention provides apparatus for permitting the utilization of exceedingly large volumes of water in the harnessing and extracting of a portion of the power generated by the rise and fall of ocean tides, ocean currents, or flowing rivers, by the provision of a dam, interposed in the flow path of the water to create a volume of water at a higher level on one side of the dam than on the other side, and a specialized chamber of limited size as compared with the water head enclosed by the dam, in which all or nearly all of the water between the high and low levels on either side of the dam is cyclically gated through the single chamber from one side of the dam to the other via a high volume gating system so as to alternately provide positive air pressure and a partial vacuum within the single chamber.

It will be appreciated that the subject system is especially well adapted to low water head systems because of its unique capability to convert low water head energy into useful work. In general, turbine type systems require relatively high water heads for efficient operation. However, the subject system is not limited to low water head situations, but may also be used regardless of the height of the water head.

The cyclic production of positive gas pressure and partial vacuum through appropriate valving may be used to power reciprocating air motors, gas turbines, or electro-chemical cells. The electro-chemical cell is one which, for instance, utilizes low pressure hydrogen and specialized electrodes to directly convert differential hydrogen pressure at the electrodes into electrical energy. In this case the chamber space above water level is filled by hydrogen instead of air.

The key to the high volume system is the use of largeorifice easily fabricated sluice gates which control the filling and emptying of the specialized chamber. Without large volume sluice gates all the energy available is not used.

In one embodiment, the specialized chamber has a barrier at the bottom which divides the bottom of the chamber in half. Large ports are provided at the bottom of the chamber to permit inflow and outflow of exceptionally high volumes or water. Structures, such as sliding or rotating plates, paddles, covers or doors are provided, in which the structures form horizontally sealing sluice gates to selectively seal off one set of ports while opening the others, so that water will cyclically rise and fall within the chamber in response to the positioning of the structures. In one embodiment, ganged sets of structures are used, in which each structure resembles a paddle. One set of paddles is oriented perpendicularly with respect to the other set to simultaneously open and seal off opposing sets of ports. The size and numbers of the paddles in combination with the large port structure enables cyclic handling of large volumes of water, thereby to permit the harnessing of energy from large volumes of water without the provision of large sized tidal chambers or large valves. In another embodiment, sliding covers, plates or doors may be used.

In a still further embodiment, a barrier is not used, but rather vertical sealing gates are used, in a flapping gate arrangement. These gates, in one embodiment, include hinged covers or doors which occlude the vertically extending inlet/outlet ports of the chambers. These gates are operated so as to cause water to rise and then fall in the chamber to produce the positive or negative pressures, with one set of gates closed and the other set of gates opened. In an automatically operated embodiment, pressures at the gates, both inside and outside the chamber, are monitored and the gate actuation is reversed when the water in the chamber reaches respectively the high and low limits corresponding to the water levels on either side of the dam. Alternatively, water level sensors may be used.

In order to increase the efficiency of the overall process, a heating unit may be provided in the positive gas pressure line to the motor or other device driven by the positive gas pressure. Increased efficiency is provided by the increase in kinetic energy of the gas due to heating and the principal that the efficiency of gas driven engines increases with increases in operating fluid temperature. The provision of a heating step has particular advantage when driving gas turbines with low pressure compressed air. Note, the heater may be placed anywhere between the specialized chamber and the engine or mover. Any fuel may be used to fire the heating unit, or solar energy or even geothermal energy may be utilized. If hydrogen is produced by the subject system, then part of the hydrogen can be burned to increase the kinetic energy of the compressed air.

In one embodiment, in which a tidal stream or bay is dammed, the system captures all of the tidal flow and extracts the energy in the water head created by the flow.

In another embodiment, energy from the flow of the Gulf Stream or like natural current can be captured in a mobile system in which a dam in the form of a flexible barrier is deployed to either side of a barge housing the subject single chamber and energy conversion apparatus. This flexible barrier dam structure is described in aforementioned U.S. Pat. No. 4,095,423 and may be used for the tidal situation described above as well as for deployment in the open ocean. In the ocean current embodiment, the flexible dam may be stretched and anchored across a part of the ocean stream with the result that water head is formed at the dam due to the inertia of the moving water as it impinges on the leading edge of the dam and in essence "crawls up" the dam wall. This head is converted into useable energy by the subject system, which energy can be used, for instance, to manufacture hydrogen as fuel for motors, or to manufacture heavy water ($D_2O$). Both processes require large amounts of electrical energy and both processes result in an easily transportable product so that the benefit of harnessing the power of an ocean current such as provided by the Gulf Stream can be obtained ashore.

The subject system can also be used for small scale power plants as well as the large scale plants described.

BRIEF DESCRIPTION OF THE DRAWINGS

These and other features of the present invention are more fully described below in the detailed description of the preferred embodiment, and in the accompanying drawing of which.

DETAILED DESCRIPTION OF THE INVENTION

What is described is a method of converting the energy of ocean tides and/or currents into useful forms. The main disadvantage of extracting tidal power or power from ocean currents arises from the low-density of the tidal power or ocean current per unit area of the ocean. In general, this leads to the high cost of required investment for production of substantial volumes of the energy. In the subject invention, high cost is overcome by directly converting the ocean energy into compressed air and, in one embodiment, by using flexible, light structures for the water barrier instead of rigid dams. The flexible barrier can be designed in such a manner that it becomes a self-supported and self-regulated structural system which can dam a large space of ocean, for instance, the entrance of the Bay of Fundy. This concept makes feasible the construction of tidal electric plants which can harness enormous power, providing environmentally clean and inexhaustible energy.

Most prior projects for harnessing tidal energy have centered around building rigid dams to separate bays with narrow entrances from oceans thereby obtaining significant level difference across the barrier during low and high tide. These systems also require construction of locks for navigation and regulation of water regimes. The dams are, in general, designed to work with water turbines which means that, for efficient operation, as high water pressure as possible is to be employed.

It has been found that the most promising way to decrease the cost of construction is to lower the hydraulic loading by decreasing the difference in water levels across the dam and simultaneously providing for the possibility of removing the barriers for the period of severe storms.

Figure 1:
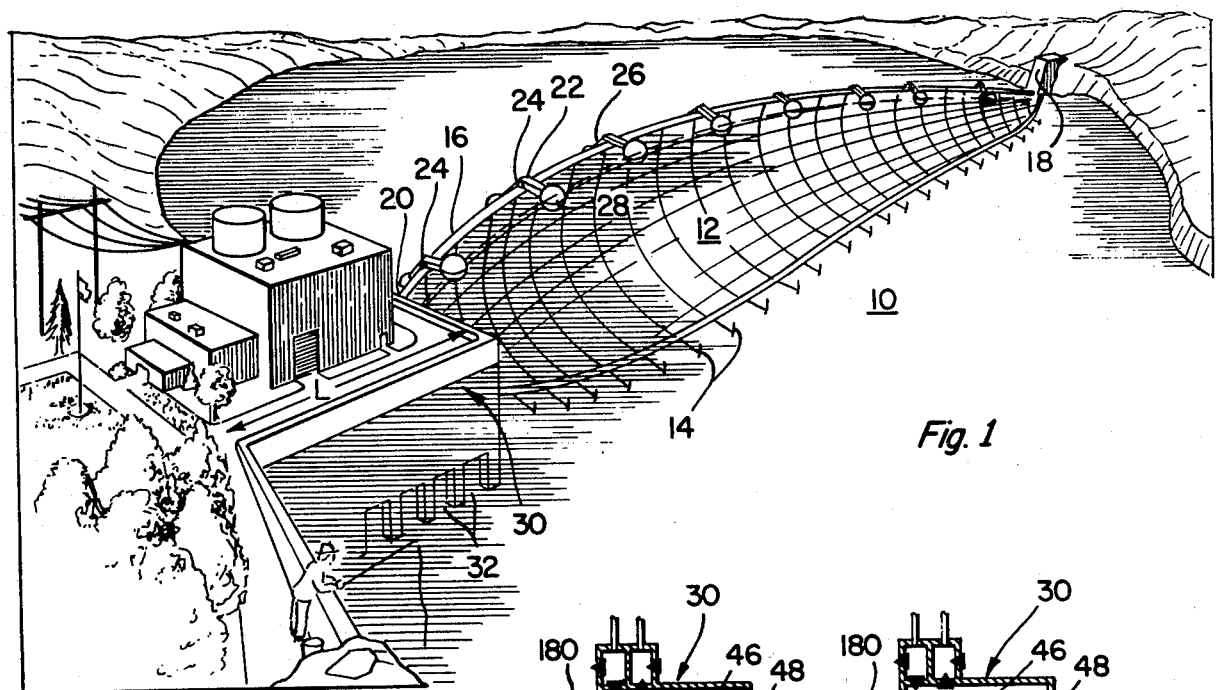
FIG. 1 is a pictorial view of the exterior of apparatus for harnessing tidal power according to the present invention.

Referring now to FIG. 1, briefly, a tidal basin 10 may be dammed by a flexible barrier 12 anchored as diagramatically illustrated at 14 to the bed of a bay, and may be held in position by cable structure 16, which is stretched across the mouth of the bay and supported at either end by structures 18 and 20 and by numbers of the anchors for specialized foundations. The top of dam 12 is floated at the surface of the water by a number of float assemblies 22 which may be optionally provided with floats in order to use their buoyancy to assist in the supporting of cable 16 and to stabilize the top of the plastic film over the water surface independently of the water level differential.

In one embodiment float assemblies 22 may include a sleeve portion 24 and a pair of arms 26 extending radially outward therefrom. The sleeve encloses the cable and is freely rotatable thereabout. A pair of floats 28 are provided for each float assembly and the end of the float arms opposite the end connected to the sleeve are connected to one of the floats. Thus, one of the floats rests on the body of water to one side of the plastic film, while the other float rests on the body of water to the other side of the plastic film. Additional features of the plastic flexible dam system are described in U.S. Pat. No. 4,095,423 mentioned above and these features are not further described here.

One end of the dam 12 is connected to one edge of the subject housing 30 and is sealed thereto. It should be noted that the bottom of housing 30 has openings or ports 32 which are arranged around the periphery of its base. As will be described, the areas of these ports are important to the proper operation of the subject system insofar as high volume water flow is permitted.

It will be noted that the size of housing 30 designated by capital L, is small as compared with the length of the dam. Thus, the volume of water held within housing 30 may be orders of magnitude less than that which is available from, for instance, the bay side of dam 12. Thus, the water utilized in producing power is that water which exists between the lower level on one side of the dam and the higher level on the other side of the dam. This water volume is considerable, and it is this water which must pass through the system during a tidal change so that its energy can be extracted.

Figure 2:
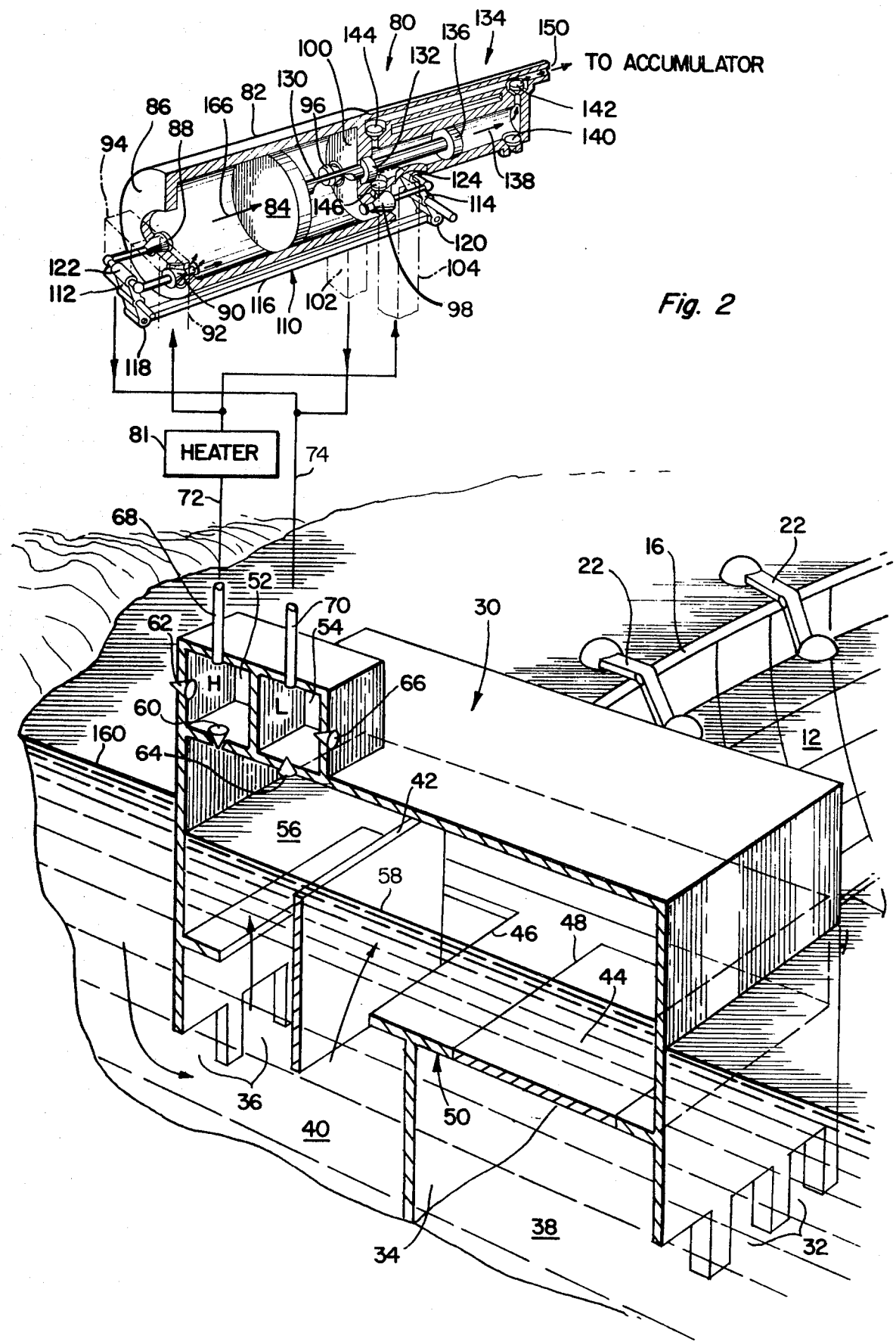
FIG. 2 is a more detailed view of the subject apparatus illustrating the single chamber, high volume gating system and pre-chambers connected to an air motor.

A system for handling such high volumes of water is illustrated in FIG. 2 in which housing 30 is illustrated in section so as to illustrate high volume gating.

Referring now to FIG. 2, as illustrated, in one embodiment housing 30 is provided with inlet/outlet ports 36 to the other side of this barrier. These ports surround the base of housing 30 such that ports 32 are associated with chamber 38, whereas inlet/outlet ports 36 are associated with a chamber 40 as illustrated.

The chambers formed by barrier 34 are selectively sealed or unsealed at the top thereof by a high volume sluice gating system which incorporates large size sluice gates 42 and 44 in the form of paddles which communicate with apertures 46 and 48 and an intermediate horizontally running barrier 50.

On top of housing 30 are a pair of pre-chambers 52 and 54 which serve to process respectively high-pressure and low-pressure air which exists in the volume 56 above water level 58 in housing 30.

The purpose of the pre-chamber is to simplify the operation of the system. Pre-chamber 52 will always operate at a pressure exceeding that of pre-chamber 54 regardless of the positive and negative pressure in the main chamber. Thus the gas flow is maintained always in one direction. This permits the use of gas turbines at higher efficiencies than would be possible with reversible gas flow. Of course, the subject system may be operated without the pre-chambers.

Pre-chamber 52 has air-control valves 60 and 62 disposed therein, whereas pre-chamber 54 has air-control valves 64 and 66 disposed therein. Pre-chamber 52 has an outlet port 68 containing high-pressure air and pre-chamber 54 has a port 70 adapted to act as a return.

In one embodiment, a heating unit 81 may be interposed in line 72 for the purpose of adding kinetic energy to the compressed gas carried by this line. As mentioned hereinbefore, fuel for the heating unit may be obtained from hydrogen which may be liberated in a downstream process. Alternatively, any type of heating fuel may be utilized and, in fact, the air may be heated via solar energy.

The purpose of the heating of the compressed gas in line 72 is to provide the gas with increased kinetic energy so that the efficiency of the follow-on engine or motor is increased.

In the illustrated embodiment, positively pressurized air from port 68 is delivered over a line 72 to any type utilization device. In one embodiment, an air motor generally indicated at 80 is utilized to convert the alternately occuring positive pressure and partial vacuum available from the pre-chambers to increase the air pressure from the pre-chambers for the subsequent use by gas turbines. In this case, compression into the air accumulator is increased directly proportional to the ratio of the areas of pistons 84 and 136. A partial vacuum is available at port 70 and may be applied to the subject air motor via line 74.

With respect to the air motor, this may be any of a number of devices and in general may include a cylinder 82 in which is disposed a piston having a large land 84. In this embodiment, one end of the cylinder 86 is provided with oppositely directed cone-shaped valves 88 and 90 connecting ports 92 and 94 respectively to positive air pressure available from port 68 and the partial vacuum available at port 70. A similarly configured set of valves 96 and 98 is positioned at the other end 100 of cylinder 82. These valves communicate respectively with ports 102 and 104 which are respectively connected to the partial vacuum available at port 70 and the positive air pressure at port 68.

The oppositely directed valves are connected such that valves 88 and 90 move together in one direction, and such that valves 96 and 98 move together in an opposite direction. A bell crank linkage system generally indicated at 110 is comprised of pivoted end-pieces 112 and 114 respectively and a connected rod 116 connects ends 118 and 120 together, with ends 122 and 124 connected to valves 88, 90 and 96, 98 respectively.

Land 84 is connected to a shaft 130 which is connected through end 100 via a bushing 132 to a secondary stage 134. This stage has a land 136 disposed in a cylinder 138 and is representative of many types of hydraulic amplifiers, with check valves 140, 142, 144 and 146 disposed in the usual manner so that air is compressed and delivered over line 150 to an accumulator (not shown).

In operation, with the sluice gates positioned as illustrated, high water illustrated by a level 160 on one side of dam 12, is admitted through ports 36 and through large apperture 46 such that the water level 58 within housing 30 rises thereby compressing air in volume 56. It will be noted that sluice gate 42 is open and sluice gate 44 is closed. The compressed air in volume 56 causes valve 60 to open, and valves 62 and 64 to close. The compressed air in pre-chamber 52 is delivered over line 72 to valve 90 which, in the illustrated configuration is opened, with connecting rod 116 being displaced to the right in the initial condition illustrated.

Compressed air acts on land 84 in the direction shown by arrow 166 pushing land 84 to the right. At this time, air to the right of land 84 is removed at valve 96 and flows into port 70 and out through valve 66, which is now in an open condition. This moves shaft 130 to the right and affects the compressing of air via land 136 moving to the right, such that compressed air exits through valve 142, and line 150 to the accumulator.

When land 84 is moved completely to the right-hand end of cylinder 82 it contacts valve 98 to push it to the right. Bell crank structure 114 is rotated in a clock-wise direction which moves tie rod 116 to the left. This opens valve 98, closes valve 96, closes valve 90, and opens valve 88. In this condition, port 104 is connected to the positive pressure line 72 and land 84 is then moved to the left pumping the accumulator through the valve 144 until land 84 reaches the left hand end of cylinder 82 at which point valve 90 is moved to the left to open it with a corresponding movement to the right of tie rod 116. In this manner, the air cylinder is actuated for positive pressure in pre-chamber 52.

When level 58 of water within housing 30 reaches a predetermined high level, sluice gate paddle 42 is revolved so as to seal chamber 40 and sluice gate paddle 44 is opened so as to permit the outflow of water from housing 30 through ports 32 to the low level side of dam 12. When this is done, a partial vacuum is developed at 56 due to the outflow of water. This causes valve 64 to open, valve 66 to close, valve 60 to close, and valve 62 to open.

As a result, a partial vacuum exists at port 94 which results in land 84 moving to the left. When land 84 has moved to the left sufficient to contact valve 90, valve 88 is closed and valve 96 is opened. At this point, the partial vacuum exists at the right hand side of land 84 and the motor reciprocates to the right.

It should be noted that a single rising of the water in the chamber causes multiple motions of the piston 84. Thus, the motor speed is not limited to the velocity of the water flow, as it is with hydroturbines.

What has been provided is a system in which positive air pressure and partial vacuum is utilized to operate motor 80 due to the rising and falling level 58 of the water housing 30.

In one embodiment, sluice gate paddles 42 and 44 are operated in a cyclic manner, with the cycle reversed anywhere from 5 to 10 minutes. This alternately provides positive air pressure and a partial vacuum in the aforementioned pre-chambers. As will be seen it is the purpose of the subject housing and sluice gating system to provide that the entire volume of water captured by the dam which is useful in producing power is, in fact, allowed to produce power by passing through the housing.

Figure 3:
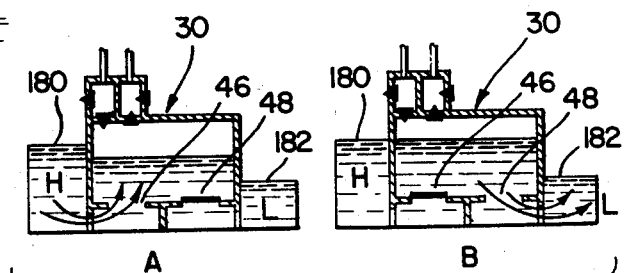
FIGS. 3 and 4 illustrate schematically and in section the operation of the single chamber of FIG. 2 for various tidal conditions.
Figure 4:
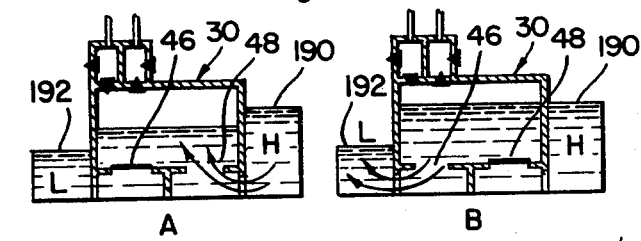

Referring to FIGS. 3 and 4, for the tidal situation, the high level water may be as illustrated at 180 and the low level at 182. During the first portion of the cycle, water is ingested as illustrated by the unsealing of aperture 46 and the sealing of aperture 48. When a pre-determined level has been reached within housing 30, the situation is reversed in which aperture 46 is sealed and aperture 48 is opened such that the water within housing 30 may fall and empty into the low level portion 182. For an opposite tidal situation, the high level is now as shown at 190, and the low level at 192, with aperture 48 intially being opened so that the water level within chamber 30 rises and aperture 46 is closed. The reverse situation occurs when the appropriate water level is reached within chamber 30 such that aperture 46 is opened and aperture 48 is closed, thereby dumping water from housing 30 to the low level side 192.

Figure 5:
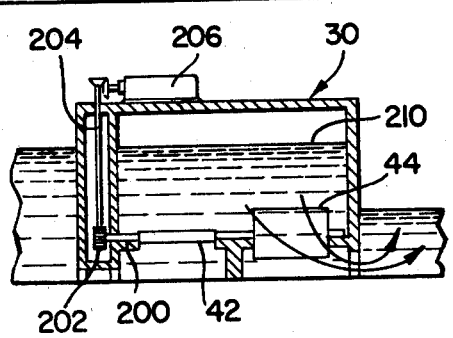
FIG. 5 is a schematic and sectional view of the actuation of paddles utilized as sluice gates in the subject invention.

As illustrated in FIG. 5, sluice gate paddles 42 and 44 are mounted orthogonally on a shaft 200 which is driven by worm gear assembly 202, linkages 204 and motor 206. Sensors, not shown, may sense the level 210 in housing 30 such that the orthogonally oriented paddles may be rotated so as to effect the sealing and unsealing described hereinbefore.

Figure 6:
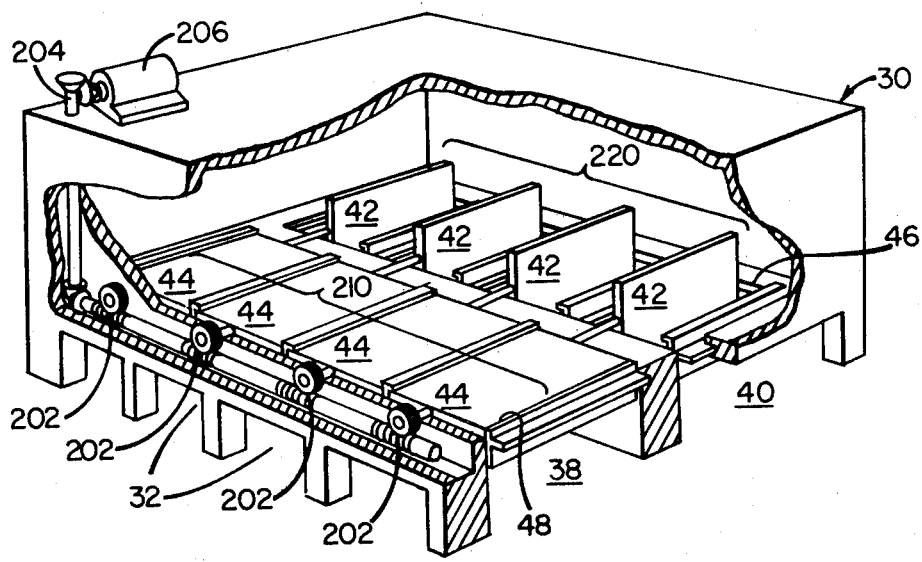
FIG. 6 is a diagramatic view of the ganged paddle structure shown in section illustrating the drive therefor.

Referring to FIG. 6, the orthogonally oriented paddles may be ganged together in groups 210 and 220 and driven in parallel by worm gear assembly 202. When operated in this ganged manner, sluice gate paddles 42 and 44 define a very high volume sluice gating system for alternately sealing and unsealing chambers 38 and 40 in housing 30.

Figure 7:
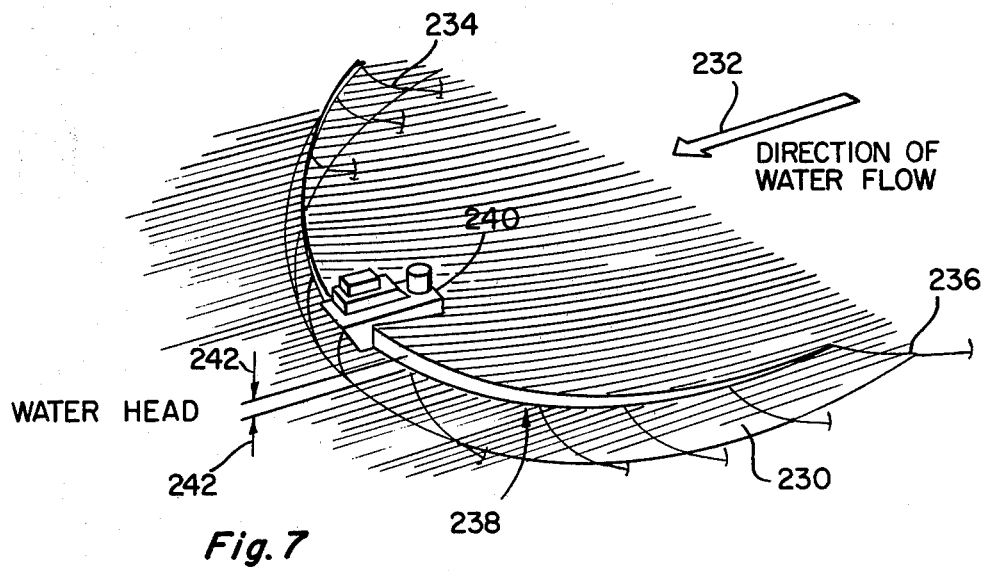
FIG. 7 is a diagramatic representation of an open sea embodiment of the subject invention illustrating the deployment of a flexible dam via anchoring, in which processing of the water head is done at a centrally located barge.
Figure 8:
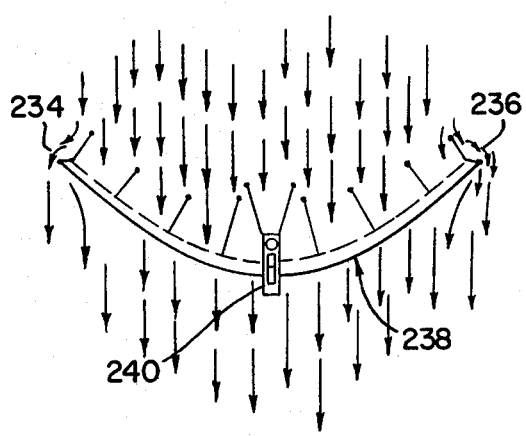
FIG. 8 is a top view of the apparatus shown in FIG. 7 diagramatically illustrating the current flow towards and away from the dam and barge.

What has been described is a system for use primarily in tidal flow areas. Referring now to FIG. 7, it is possible to harness the energy in a Gulf Stream type of situation in which current low can be utilized to create a water head. In this embodiment, a dam 230 is anchored across the direction of water flow as indicated by arrow 232 such that the ends 234 and 236 may extend for as much as several miles. Interposed at a central region of the dam is a barge structure 240 which carries apparatus for processing the water head indicated by arrows 242. The flow of water is as illustrated in FIG. 8 in which like elements between FIGS. 7 and 8 carry like reference characters.

Figure 9A:
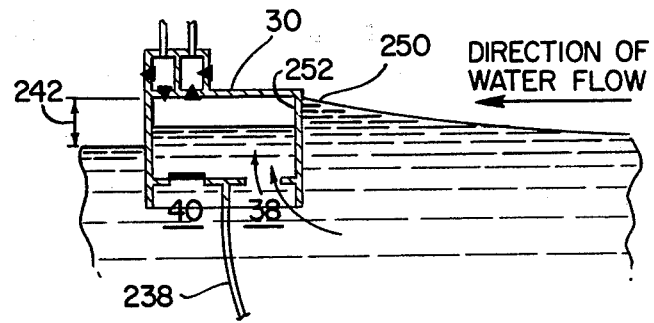
FIGS. 9A and 9B are diagramatic representations of the open ocean system as illustrated in FIG. 7 and FIG. 8, illustrating the momentum induced water head produced by ocean currents and the like, and diagramatically illustrating the specialized chamber for deriving power from the relatively low level water head.

As illustrated in FIG. 9A, a housing 30 identical to that which is utilized in the tidal embodiment may be located on the barge and utilized in exactly the same manner as that described in the tidal embodiment. As can be seen in FIG. 9A, the bottom of housing 30 is left open to the surrounding sea such that the aperture for chambers 38 and 40 is indeed large. In this case, the volume of water handled is limited by the paddle size which may be only slightly smaller than the open bottom aperture of the housing.

Figure 9B:
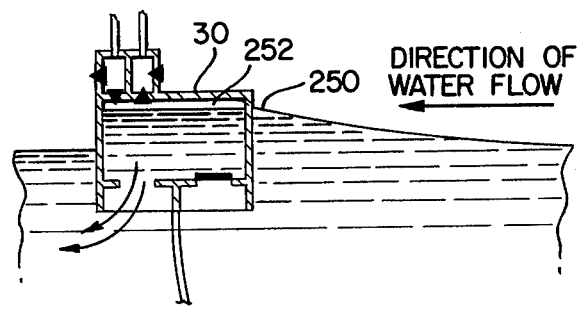

Because of the direction of flow of water and the momentum of the water, the water line as illustrated at 250 moves up the side 252 of the dam and the housing so as to produce a water head such as illustrated by arrow 242 which may be on the order of several feet. While this is ordinarily not a large water head, because of the provision of the subject apparatus, this rather low-density energy may be utilized to advantage. In this case, the level of water in housing 30 rises to a pre-determined level at which point the aforementioned sluice gates are reversed so that, as illustrated in FIG. 9B, water is removed from the chamber thereby creating the partial vacuum described hereinbefore. The only difference in the current flow situation is that water is always flowing in the same direction which is not the case for tidal flows which reverse direction roughly every 6 hours.

As mentioned hereinbefore, energy harvested from the water head may be utilized on board the barge to manufacture liquid hydrogen which then may be transported by ship to a shore for installation utilization. It is also possible to process and manufacture heavy water (deterium oxide). Deterium oxide is utilized in nuclear plants and for defense purposes.

The subject mobile or transportation dam-type structure may be utilized anywhere, even within rivers and provides for the utilization of low-density energy in the low water head range.

Figure 10:
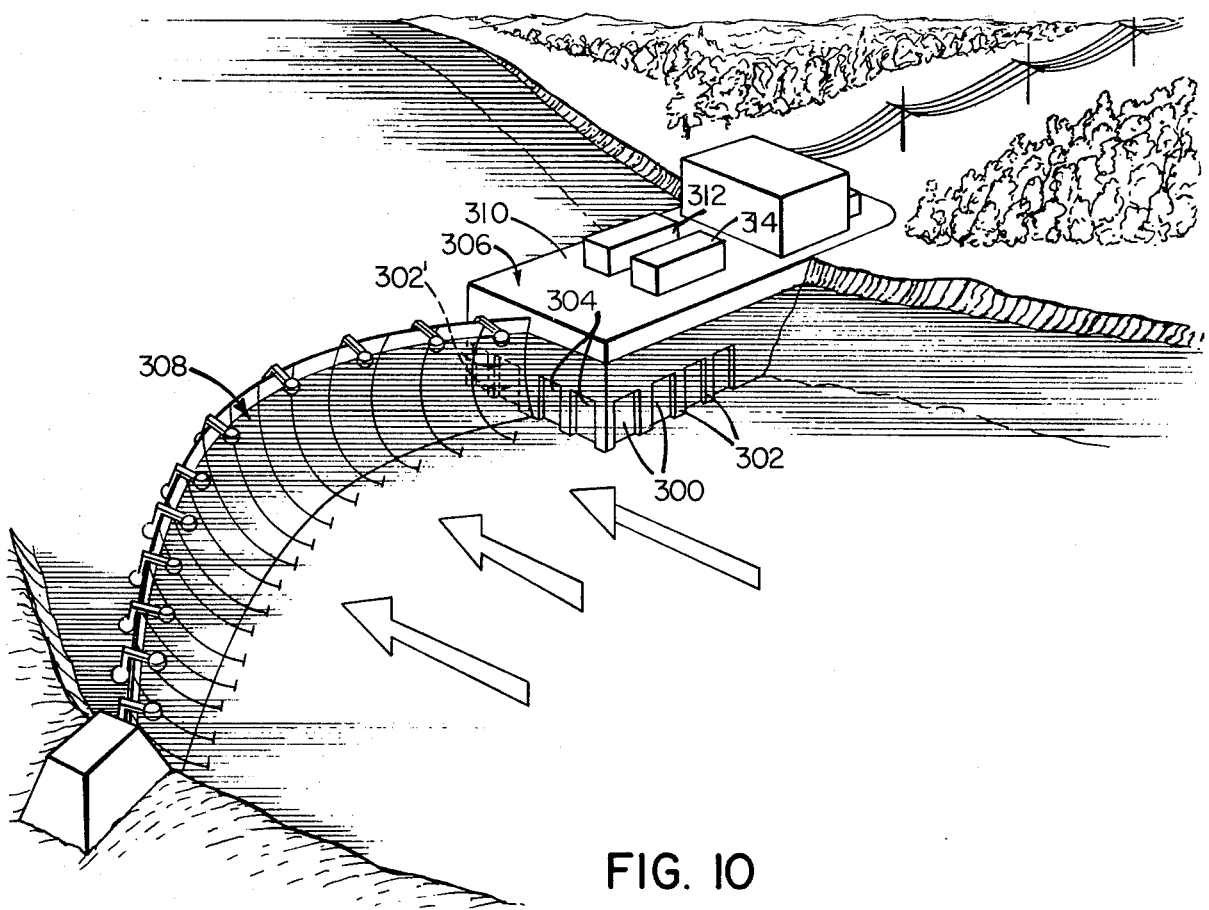
FIG. 10 illustrates diagramatically the vertical gate flapping system for a tidal power application; and, FIGS. 11A and 11B illustrate the operation of a vertically extending gate system.

Referring now to FIG. 10, a vertical flapping sluice gate embodiment is illustrated in which sluice gate covers 300 are disposed in inlet/outlet orifices 302 in the vertically extending walls 304 of housing 306. A dam 308 stretches across an inlet or the like and divides the inlet/outlet orifices into two sets which are alternately opened and closed by the sluice gates. Thus orifices 302' are open whereas orifices 302 are closed. Housing 306 has a chamber 310 on which are located prechambers 312 and 314, the purpose of which is the same as described hereinabove.

Figure 11A:
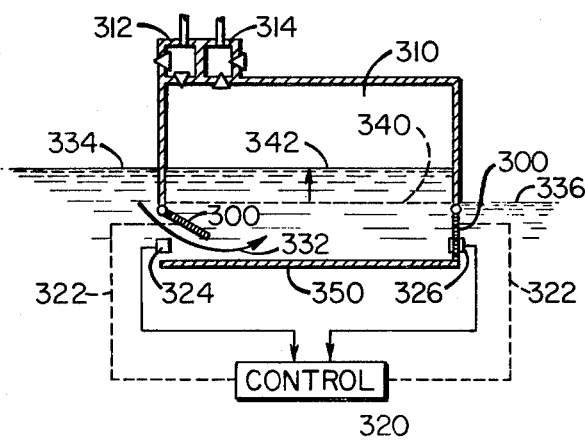
Figure 11B:
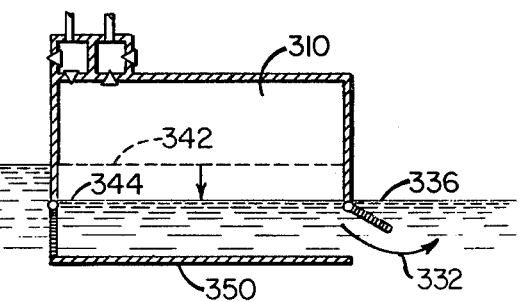

Referring to FIGS. 11A and 11B, as can be seen chamber 310 is not centrally divided with a barrier but is rather provided with sluice gate covers or doors 300 which are hinged at the top in one embodiment, and are actuated through a control circuit 320 and mechanical linkage 322, such that the sets of gates are operated alternately in that when one set of gates is open, the other set of gates is closed. It will be noed that these sets of gates straddle the dam at the lower periphory of housing 306 such that gates to one side of the dam form one set, while gates on the other side form the other set.

In order for the control unit to properly position the gates, pressure-sensing apparatus may be utilized. In one embodiment, a pressure sensor 324 is located at the left-hand gate and senses a differential pressure $P_1$ across the gate which is the exterior flow induced pressure. Likewise, a pressure sensor 326 is located at the right-hand gate 300 and the differential pressure which is sensed across this gate is $P_2$.

In operation, with flow as illustrated by arrow 332 from a higher level 334 to a lower level 336, initially left-hand gate 300 is opened and the water level 340 in chamber 310 rises to a level 342 equal to level 334. At this point, the pressure across the left-hand gate is zero and the position of the sets of gates is reversed such as illustrated in FIG. 11B. Then level 342 drops to a level 344 which is that at which it matches level 336. At this point, the pressure across the right-hand gate is zero and the gates are again reversed. The control circuit therefore senses zero pressure differential at the gates and causes the gates to reverse position.

In one embodiment, a self-latching system can be used in which each of the hinged doors is provided with a pressure-actuated lock. This lock is preferably along the bottom edge of the door and is set to release at a pre-determined pressure. This pressure is that corresponding to the differential pressure head between the high and low points of the water in the chamber.

In operation, with water flowing from the high side of the dam through the chamber to the low side, and with water at a low level within the chamber, the pressure-actuated locks for the doors on the high side will open and water will rush in to fill the chamber.

When the chamber is filled to a level corresponding to the water level on the high side of the dam, the doors on the high side of the dam will fall back into place and lock.

At this time, the doors on the low side of the dam will be unlocked because the pressure differential across these doors will have reached the pre-determined pressure head. With the unlocking of the low side doors, water will rush out of the chamber until such time as the water level in the chamber drops to the level of the water at the low side of the dam.

When this happens, the pressure head at the doors on the high side reaches the pre-determined pressure head and these doors are unlocked which starts the cycle over again.

As can be seen, this is a very simple, automatic system in which by merely locking and unlocking the doors, the chambers are made to fill and discharge water, with the doors closing when the pressure differential across them is zero. When this pressure differential is zero, the doors close and lock of their own weight.

Alternatively, level sensors may be utilized for the reversing of the position of the gates.

In any event, positive and negative pressures are cyclically formed in chamber 310 which are processed by the prechambers 312 and 314 as described hereinabove.

Obviously the situation for the flood may be reversed for the ebb, with the gates operating to alternately open and close their respective large orifices, perhaps once every 5 or 10 minutes.

This system can also be utilized for the floating platform situation assuming housing 306 is provided with a bottom 350.

What will be appreciated is that this is an extremely simple method of gating large volumes of water through the specialized chamber and that this gating may be accomplished automatically either through level sensors or through pressure sensing apparatus.

With respect to the floated dam, it should be pointed out that a floated dam cannot be overloaded. Because of the limited buoyancy of the floats they submerge when the ocean waves increase the designed magnitude of a water head. The flexible barrier is practically non-sensitive to sliding foundations and earthquakes. If some sections of the barrier are destroyed, only limited leakages occur which cannot change the overall stability of the structure or impose danger to people. Note further that the floats which maintain the upper edge of the flexible dam structure can be combined with the devices for harnessing energy of the water waves. Such a combination increases the efficiency of the system.

Finally, it will be appreciated that the power house for the conventional tidal power project usually takes the main part of the investment due to the fact that low-speed bulky hydroturbines require enormous space for their installation. With the subject approach, the energy of the tide is converted into the energy of compressed air by means of specialized chambers which are put on the ocean bed. Ocean water from the dammed region passes through the chamber where it works as a natural piston compressing air in the upper part of the closure. After that the compressed air can be heated and expanded through high-speed compact gas-turbines or any type of reciprocating engines. Such a solution drastically decreases the dimension of a power house and increases efficiency of the engines.

The above thus described embodiments for the present invention are illustrative only, alterations and modifications deemed to be within its scope and spirit. The breadth of the invention is intended to be limited as defined in the following claims.

What is claimed is:

1. Apparatus for extracting power from ocean tides, ocean currents, or flowing rivers comprising:
    means including a dam interposed in a water flow path for creating a water head between water at one level on one side of the dam and water at another level on the opposite side of the dam;

means for cyclically creating positive gas pressure and a partial vacuum in a rapidly cycled manner responsive to water flow from one side of said dam to another side thereof including a housing having at least one wall sealed to said dam along a vertical line defining a vertically oriented plane through said housing and having a bottom submerged in water, said housing defining a single chamber having no internal water conveying passageways connected thereto through which water flows to effect the operation of the gas pressure and vacuum creating means, with said bottom having ports extending across the bottom thereof so as to substantially open the whole bottom wall of the housing to the surrounding water, the ports to opposite sides of said vertical plane providing two sets of high volume ports, flap gates actuated in response to a predetermined water pressure differential thereat for alternately and rapidly sealing one set of ports to one side of said vertical plane while rapidly unsealing the other set of ports to the other side of said vertical plane to promote rapid filling of said housing with water to create a positive gas pressure at the top of said housing and to promote the production of a partial vacuum at the top of said housing with rapid water flow and means at said flap gates for sensing said pressure differential and for actuating said flap gates.

2. Apparatus for extracting power from ocean tides, ocean currents, or flowing rivers comprising:
means including a dam interposed in a water flow path for creating a water head between water at one level on one side of the dam and water at another level on the opposite side of the dam; and,
means for cyclically creating gas pressure and a partial vacuum in a rapidly cycled manner responsive to water flow from one side of said dam to another side thereof including a housing having at least one wall thereof sealed to said dam at a vertically oriented line defining a vertically oriented plane through said housing, and having a bottom submerged in water, said housing defining a single chamber having no internal water conveying passageways connected thereto through which water flows to effect the operation of the gas pressure and partial vacuum creating means, with said bottom having two sets of ports at the bottom thereof to either side of said vertical plane so as to substantially open the whole bottom wall of the housing to the surrounding water, two sets of high volume sluice gate means at said bottom ports, each of said sets of sluice gate means being actuated in response to a predetermined water pressure differential thereat, whith the sets of sluice gate means selectively and rapidly occluding different sets of said ports for promoting rapid filling of said housing with water to create a positive gas pressure at the top of said housing and for promoting the production of a partial vacuum at the top of said housing with rapid water outflow and means for sensing said pressure differential and for actuating said sluice gate means.

3. Apparatus for extracting power from ocean tides, ocean currents or flowing rivers comprising:
means including a dam interposed in a water flow path for creating a water head between water at one level on one side of the dam and water at another level on the opposite side of the dam; and,
means for cyclically creating positive gas pressure and a partial vacuum responsive to water flow from one side of said dam to another side thereof including a housing having a bottom submerged in water, with said bottom having parts at the bottom thereof, said housing having barrier means for separating the bottom of said housing into two chambers, each with a separate set of ports and means for alternately sealing the top of one chamber while unsealing the top of the other chamber to promote filling of said housing with water to create a positive gas pressure at the top of said housing and to promote the production of a partial vacuum at the top of said housing with water outflow, said alternate sealing and unsealing means including at least one structure having a central axis about which it may be rotated so as to selectively seal one of said chambers and at least another of said structures having a central axis about which it may be rotated so as to selectively seal the other of said chambers, and means for mounting and actuating said structures so as to seal and unseal opposing chambers responsive to the water level in said housing.

4. The apparatus of claim 3 wherein said mounting and actuating means includes a shaft and means for mounting said structures to said shaft in orthogonal directions such that rotation of said shaft causes unsealing of one chamber with the sealing of the other chamber.

5. The apparatus of claim 4 wherein said structures are paddle-shaped and wherein said paddle-shaped structures are mounted at the top of said barrier means and are rotatable such that sides of a paddle-shaped structure communicates with a vertically rising sidewall of said housing and the top of said barrier to seal a corresponding chamber.

6. The apparatus of claim 5 wherein said alternate sealing and unsealing means includes a number of sets of paddles, a corresponding number of shafts, the paddles in a set mounted on a shaft in an orthogonal arrangement, and means for driving said shafts in parallel to effect a ganged arrangement.

7. Apparatus for processing all the water head created by differential water levels on either side of a dam comprising:
means for cyclically creating positive gas pressure and a partial vacuum responsive to water flow from one side of said dam to another side thereof including a housing having a bottom submerged in water, with said bottom having ports at the bottom thereof of sufficient size to admit all the water which creates said water head, said housing having barrier means for separating the bottom of said housing into two high volume chambers, each with a separate set of ports and means for alternately sealing the top of one chamber while unsealing the top of the other chamber to promote rapid filling of said housing with water to create a positive gas pressure at the top of said housing and to promote the rapid production of a partial vacuum at the top of said housing with water outflow, said alternate sealing and unsealing means including at least one structure having an axis about which it may be rotated so as to selectively seal one of said chambers and at least another of said structures having an axis about which it may be rotated so as to selectively seal the other of said chambers, and means for mounting and actuating said structures so as to seal and unseal opposing chambers responsive to the water level in said housing.

8. The apparatus of claim 7 wherein said mounting and actuating means includes a shaft and means for mounting said structures to said shaft in orthogonal directions such that rotation of said shaft causes unsealing of one chamber with the sealing of the other chamber.

9. The apparatus of claim 8 wherein said structures are paddle-shaped and wherein said paddle-shaped structures are mounted at the top of said barrier means and are rotatable such that sides of a paddle-shaped structure communicates with a vertically rising sidewall of said housing and the top of said barrier to seal a corresponding chamber.

10. The apparatus of claim 9 wherein said alternate sealing and unsealing means includes a number of sets of paddles, a corresponding number of shafts, the paddles in a set mounted on a shaft in an orthogonal arrangement, and means for driving said shafts in parallel to effect a ganged arrangement.

* * * * *